United States Patent
Matsushima et al.

(10) Patent No.: US 8,982,153 B2
(45) Date of Patent: Mar. 17, 2015

(54) DISPLAY CONTROL APPARATUS, CONTROL METHOD THEREFOR, AND NON-TRANSITORY COMPUTER-READABLE STORAGE MEDIUM

(75) Inventors: Shuichiro Matsushima, Tokyo (JP); Tomohiro Ota, Kawasaki (JP); Tomohiro Yano, Yokohama (JP); Toshimichi Ise, Yokohama (JP); Kurumi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 376 days.

(21) Appl. No.: 13/309,028

(22) Filed: Dec. 1, 2011

(65) Prior Publication Data
US 2012/0154430 A1 Jun. 21, 2012

(30) Foreign Application Priority Data
Dec. 20, 2010 (JP) ................................ 2010-283733

(51) Int. Cl.
*G09G 5/00* (2006.01)
*G06F 3/0488* (2013.01)
*G06T 11/60* (2006.01)

(52) U.S. Cl.
CPC .............. *G06F 3/0488* (2013.01); *G06T 11/60* (2013.01)
USPC ......................................... 345/629; 382/284

(58) Field of Classification Search
CPC G09G 5/14; G09G 2340/10; G09G 2340/125
USPC ................... 345/619, 629; 382/284
See application file for complete search history.

(56) References Cited

U.S. PATENT DOCUMENTS

| | | | | |
|---|---|---|---|---|
| 5,689,717 | A | * | 11/1997 | Pritt ................................ 715/234 |
| 2006/0048069 | A1 | * | 3/2006 | Igeta ............................... 715/769 |
| 2008/0119235 | A1 | * | 5/2008 | Nielsen et al. ................ 455/566 |
| 2010/0315438 | A1 | * | 12/2010 | Horodezky et al. ........... 345/661 |

FOREIGN PATENT DOCUMENTS

| | | |
|---|---|---|
| CN | 101051257 A | 10/2001 |
| JP | 07-200133 | 8/1995 |
| JP | 07-219701 A | 8/1995 |
| JP | 2000-207087 A | 7/2000 |
| JP | 2001-188525 | 7/2001 |

OTHER PUBLICATIONS

Feb. 8, 2014 Chinese Office Action that issued in Chinese Patent Application No. 201110430123.5.
Jun. 27, 2014 Japanese Office Action that issued in Japanese Patent Application No. 2010-283733.

* cited by examiner

*Primary Examiner* — Maurice L McDowell, Jr.
(74) *Attorney, Agent, or Firm* — Cowan, Liebowitz & Latman, P.C.

(57) ABSTRACT

When rendering a graphic according to the locus of an input position, it is determined whether a region which has been preset for the graphic to be rendered, and has the start position of the continuous input as a reference overlaps a region preset for an already rendered graphic by a predetermined amount or more. If it is determined that the regions do not overlap each other by the predetermined amount or more, a graphic is rendered according to the locus of the input position. Alternatively, if it is determined that the regions overlap each other by the predetermined amount or more, control is switched to remove the already rendered graphic according to the locus of the input position.

31 Claims, 8 Drawing Sheets

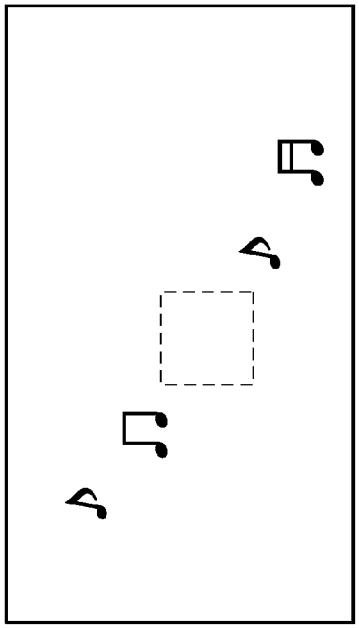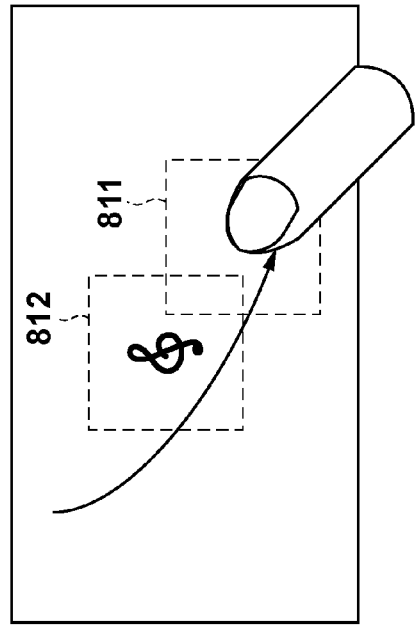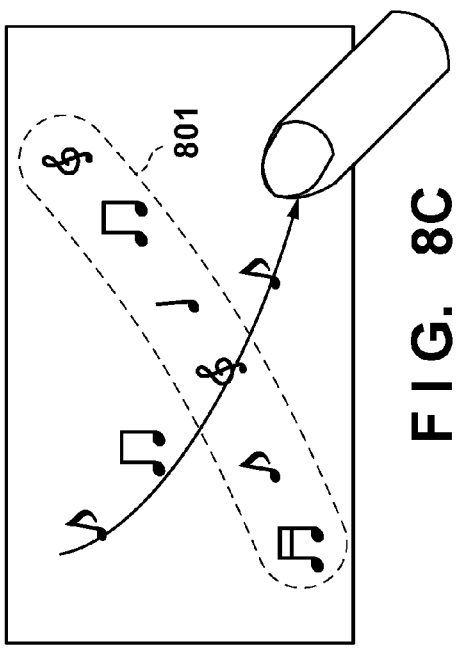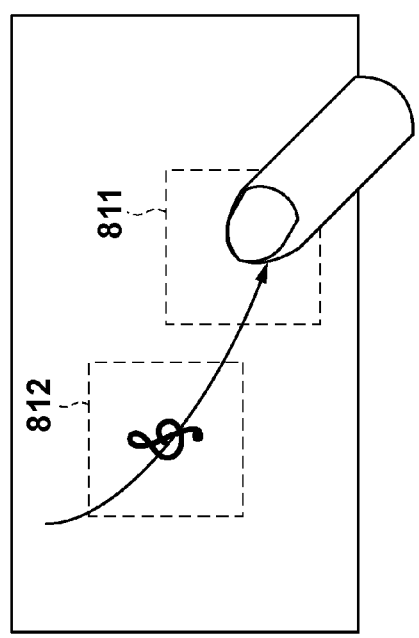

DISPLAY CONTROL APPARATUS, CONTROL METHOD THEREFOR, AND NON-TRANSITORY COMPUTER-READABLE STORAGE MEDIUM

BACKGROUND OF THE INVENTION

1. Field of the Invention

The present invention relates to a technique of rendering a graphic at an input position on a screen, or removing a graphic rendered at the position.

2. Description of the Related Art

Recent portable devices such as digital cameras or mobile phones having a camera enable a user to add various effects to a captured image or moving image. A mobile phone, for example, allows the user to place icons such as graphics, handwritten characters, and the like on a captured image, attach the generated image to an e-mail message, and then transmit it to another user. In recent years, some of the above-described portable devices adopt a touch panel display as a display device, thereby enabling the user to more intuitionally place graphics, characters, and the like on an image.

When placing a graphic within an image or moving image, the user may erroneously place the graphic at an undesired location. Some of the above-described devices, therefore, have a function of removing an already placed graphic. The above-described portable devices often have a small display device, and display only a limited number of menus such as recently used functions to make an image rendering region as large as possible. In such a portable device, to select a menu for removing a graphic and actually delete the graphic, the user needs to perform complicated operations.

Japanese Patent Laid-Open No. 07-200133 has disclosed an input device which uses a pen-based user interface and switches between an input mode and a removal mode depending on a pen tip width.

Graphics placed within an image or moving image may overlap each other. If graphics overlap each other, it is difficult to view the graphics such that they are identifiable. More specifically, when animation is set for the placed graphics, it is difficult to identify the graphics, which may not give additional effects but cause user discomfort.

Japanese Patent Laid-Open No. 2001-188525 has disclosed the following technique. That is, when a new image is instructed to be placed at a position which falls within a region that has been set based on the shape of an image, prohibited from overlapping, of those placed within an image, the new image is controlled to be placed in a blank region other than that region.

When an input device switches between an input mode and a removal mode depending on a pen tip width as described in Japanese Patent Laid-Open No. 07-200133, however, the input device requires a special input user interface and, therefore, is not a general-purpose device.

When an image is placed in a blank region other than a region which has been set based on the shape of an image prohibited from overlapping as described in Japanese Patent Laid-Open No. 2001-188525, the image is placed at a position different from that desired by the user and, therefore, the user may have the impression that it is inconvenient.

SUMMARY OF THE INVENTION

The present invention has been made in consideration of the above problems of the conventional techniques. The present invention provides a technique of facilitating removing a graphic already rendered in an image. The present invention also provides a technique of generating an image in which graphics have been rendered at desired positions while avoiding the graphics from overlapping.

The present invention in its first aspect provides a display control apparatus comprising: a position input unit configured to input a position on a screen of a display device; a rendering unit configured to render a graphic according to a locus of the input position input by the position input unit; a first determination unit configured to determine whether a predetermined region having, as a reference, a start position of one input performed by the position input unit overlaps a region preset for the graphic already rendered by the rendering unit by not less than a predetermined amount; and a control unit configured to control, when the first determination unit determines that the predetermined region having the start position as a reference does not overlap the preset region by not less than the predetermined amount, to cause the rendering unit to render a graphic according to the locus of the input position, and to control, when the first determination unit determines that the predetermined region having the start position as a reference overlaps the preset region by not less than the predetermined amount, to remove the graphic already rendered by the rendering unit according to the locus of the input position.

Further features of the present invention will become apparent from the following description of exemplary embodiments (with reference to the attached drawings).

BRIEF DESCRIPTION OF THE DRAWINGS

FIGS. 8A, 8B, 8C, and 8D are views for explaining input position overlapping determination according to the embodiment of the present invention.

DESCRIPTION OF THE EMBODIMENTS

A preferred embodiment of the present invention will be described in detail below with reference to the accompanying drawings. In the embodiment to be described below, a case in which the present invention is applied to a digital video camera capable of rendering or removing a graphic depending on an input position on a screen will be explained. The present invention, however, is applicable to an arbitrary device capable of rendering or removing a graphic depending on an input position on a screen.

Figure 1:
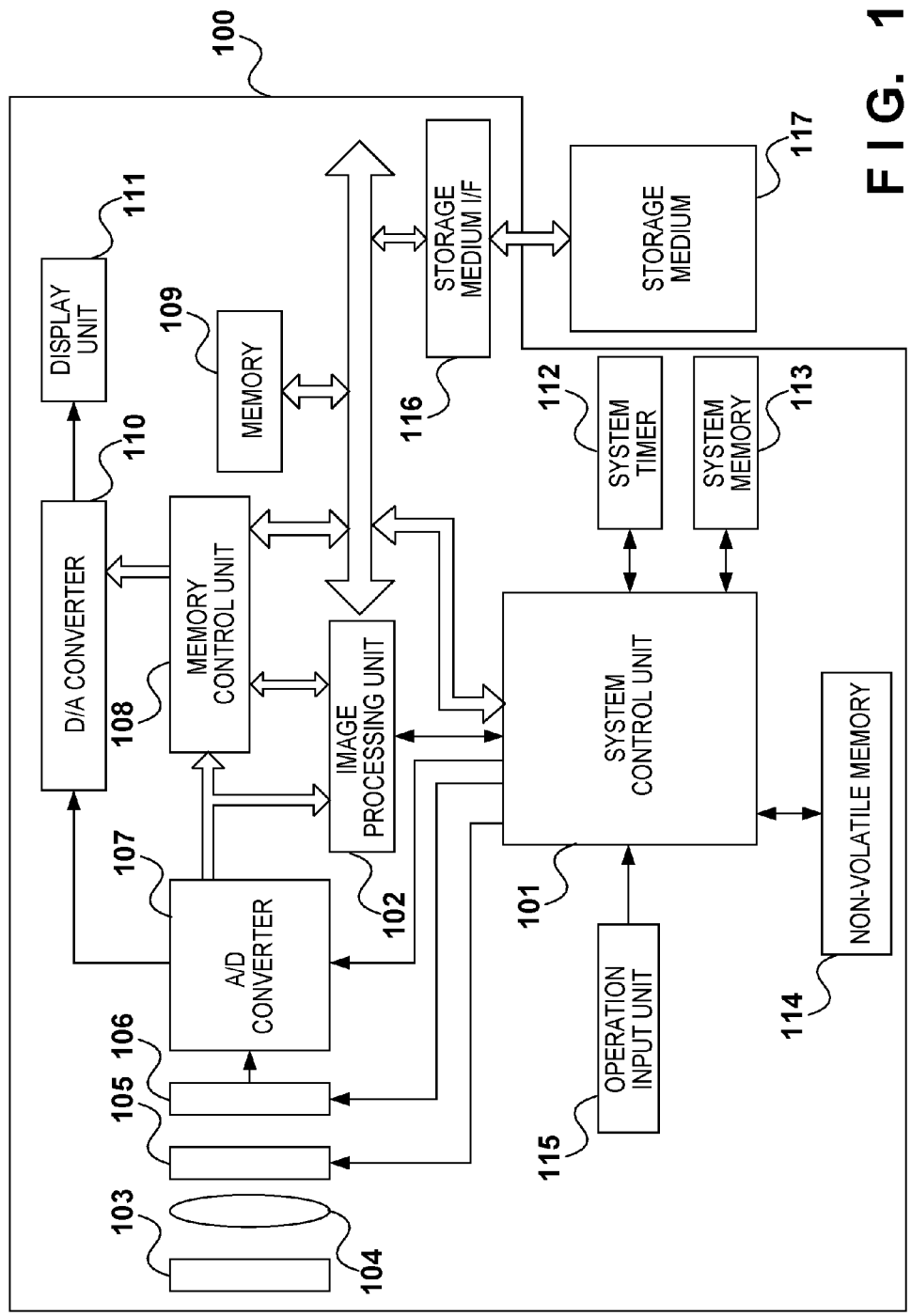
FIG. 1 is a block diagram showing the functional configuration of a digital video camera 100 according to an embodiment of the present invention.

FIG. 1 is a block diagram showing the functional configuration of a digital video camera 100 according to the embodiment of the present invention.

A system control unit 101 is, for example, a CPU which controls the operation of each block of the digital video camera 100. More specifically, the system control unit 101 controls the operation of each block by reading out an operation program stored in, for example, a non-volatile memory 114 for each block of the digital video camera 100, expanding the program on a system memory 113, and executing it. The non-volatile memory 114 is, for example, an electrically erasable programmable memory such as an EEPROM, which stores parameters and the like necessary for the operation of each block of the digital video camera 100 in addition to the operation program of each block. The system memory 113 is, for example, a RAM which is used as not only an expansion area for the operation program of each block of the digital video camera 100 but also an area for temporarily storing intermediate data and the like output in the operation of each block.

In the embodiment, the operation program of each block of the digital video camera 100 controls the operation of the block. The present invention, however, is not limited to this, and each block may include a circuit which executes the same processing as that of a corresponding operation program.

A photographing lens 104 comprises a photographing lens group of the digital video camera 100 including a focus lens, and images an optical image on an image capturing unit 106 via an aperture stop and a shutter 105 having an ND filter function. The image capturing unit 106 is, for example, an image sensor such as a CCD or CMOS sensor, which converts the optical image imaged via the photographing lens 104 into an analog image signal, and outputs it to an A/D converter 107. The A/D converter 107 performs A/D conversion processing for the analog image signal input from the image capturing unit 106, and converts the analog image signal into a digital image signal (an image). A barrier 103 covers an imaging optical system including the photographing lens 104, shutter 105, and image capturing unit 106, thereby preventing the imaging optical system from being soiled or damaged.

An image processing unit 102 executes predetermined pixel interpolation, resizing processing such as reduction processing, or color conversion processing for an image output from the A/D converter 107 or an image read out from a memory 109 by a memory control unit 108 (to be described later). Furthermore, the image processing unit 102 executes computation processing associated with exposure control and focus detection control using an image which has been input by the A/D converter 107 upon capturing, and outputs the computation result to the system control unit 101. Based on the computation result, the system control unit 101 performs exposure control and focus detection control by operating the photographing lens 104 and shutter 105 using a driving system (not shown).

Assume that the digital video camera 100 of this embodiment adopts TTL (Through-The-Lens) AF (Auto Focus) processing and AE (Auto Exposure) processing. Note that the AE processing controls the shutter speed, the aperture stop, the ND filter, and a gain applied to a digital image signal in the image processing unit 102. The image processing unit 102 executes predetermined computation processing using captured image data, and also executes TTL AWB (Auto White Balance) processing based on the obtained computation result.

Assume that when the digital video camera 100 is used in a normal mode in which a moving image is captured, it executes the AF processing, AE processing and AWB processing in real time. When an automatic execution setting for each processing is canceled, however, it is possible to manually set parameters for each processing.

The memory control unit 108 controls an operation of reading out information from the memory 109, and an operation of writing information in the memory 109. The memory control unit 108 writes, in the memory 109, a digital image signal input from the A/D converter 107 or an image signal which have undergone various processes and then output by the image processing unit 102. Assume that the memory 109 is designed to have an enough storage capacity for storing information since audio information in capturing a moving image is also written in addition to an image group associated with the frames of the moving image in capturing the moving image.

In addition to a captured image, a display image to be displayed on a display unit 111 (to be described later) is written in the memory 109. To display the display image on the display unit 111, the memory control unit 108 reads out the display image from the memory 109, and outputs the image to a D/A converter 110 (to be described later) for displaying it on the display unit 111.

The D/A converter 110 executes D/A conversion processing for an input digital image signal, and outputs the obtained analog image signal to the display unit 111, which then displays it. The display unit 111 serves as, for example, a display device such as a compact LCD, which displays an analog image signal output from the D/A converter 110. The display unit 111 functions as an electronic viewfinder by inputting, to the D/A converter 110, digital image signals successively output from the A/D converter 107 upon capturing, converting them into analog image signals again, and displaying (live-view displaying) them on the display unit 111.

A system timer 112 is a timer incorporated in the digital video camera 100, which is, for example, used to obtain a time stamp or measure an elapsed time in each program or process executed by the system control unit 101.

An operation input unit 115 is a user interface such as a power button, a mode selection SW, or a release button included in the digital video camera 100, which analyzes an operation input by the user operation of each operation member, and transmits the input operation to the system control unit 101.

Assume that the display unit 111 of the embodiment is a touch panel display, and the operation input unit 115 also detects a touch input performed on a touch panel, such as an input operation for a GUI button displayed on the display unit 111. The display unit 111 includes a display device and a touch panel. The touch panel is made of a transparent material so that display of the display unit 111 is visible, and is attached on the display surface of the display device. The position of a touch input on the touch panel on the display device, which is detected by the operation input unit 115, corresponds to a position on the screen of the display device. When a touch input is performed, the operation input unit 115 detects the position of the touch input as coordinates on the screen. Note that the operation input unit 115 can detect a touch input by assigning the touch input to one of the following states (operations) according to a continuation state and the movement speed of an input position.

touchdown: a state at the moment when a touch input is recognized touchon: a state in which a state wherein a touch input is recognized continues for a predetermined period of time or longer move: a state in which a touchon is detected and an input point is being moved by a predetermined distance or longer or being moved at a predetermined speed or higher (such as dragging)

touchup: a state at the moment when, since an input position is not recognized for a predetermined period of time or longer, it is determined that an input operation has been stopped flick: a state in which a touchup is performed immediately after moving at a predetermined speed or higher (such as flicking by a finger)

touchoff: a state in which a touch input is not performed tap: a state in which after a touchdown, a move is not detected but a touchup is detected (a single touch)

In the embodiment, each process executed by the digital video camera 100 will be described using the above-described seven states. The state names and designation of a state as a trigger for each process are merely examples, and the present invention is not limited to them.

Although a case in which the operation input unit 115 detects a touch input performed on the touch panel has been described in this embodiment, the present invention is not limited to this. That is, for the touch panel, various types of touch panel can be used, such as a resistance film type touch panel, a static capacitance type touch panel, a surface acoustic wave type touch panel, an infrared type touch panel, an electromagnetic induction type touch panel, an image recognition type touch panel, and an optical sensor type touch panel. An input to be detected depends on the type of touch panel. That is, when an input is detected without directly touching the touch panel according to the type of touch panel, the operation input unit 115 detects the input and transmits it to the system control unit 101.

A storage medium I/F 116 is an interface for connecting the digital video camera 100 to a storage medium 117, such as a memory card or HDD, which is a storage device detachably connected to the digital video camera 100. The storage medium 117 records, via the storage medium I/F 116, the image and voice of a moving image which has been encoded by the image processing unit 102 according to a predetermined encoding scheme.

(GUIs for Rendering Tools)

Rendering tools displayed on the display unit 111 of the digital video camera 100 of the embodiment will be explained with reference to FIGS. 2A, 2B, 2C, 2D, 2E, and 2F. A rendering tool is used when the user renders an overlapping line and graphic on a captured image live-view displayed on the display unit 111. When recording a moving image, it is possible to reflect and record a graphic and the like which has been rendered using a rendering tool.

Figure 2A:
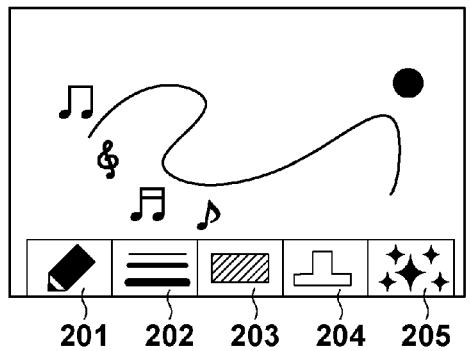
FIGS. 2A, 2B, 2C, 2D, 2E, and 2F are views each showing a GUI for explaining rendering tools according to the embodiment of the present invention.

FIG. 2A shows a state in which a tool bar for various settings of the rendering tools is displayed on the display unit 111. The tool bar includes five icons, that is, a rendering tool selection icon 201, a line type selection icon 202, a color selection icon 203, a stamp selection icon 204, and an animation stamp selection icon 205. When the user taps each icon, it is possible to transit to a setting or selection GUI corresponding to each item.

Figure 2B:
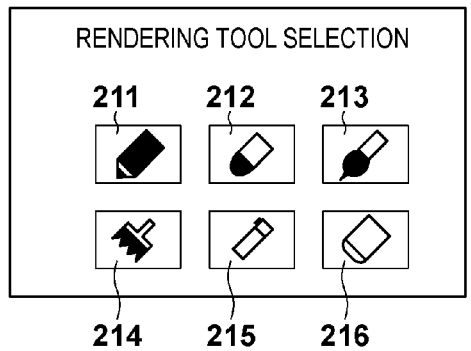
Figure 2C:
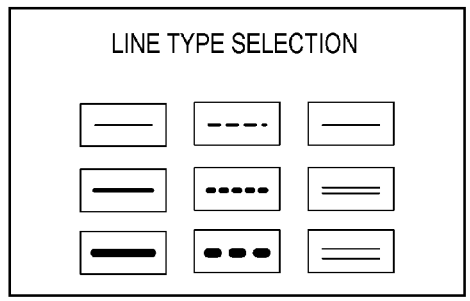
Figure 2D:
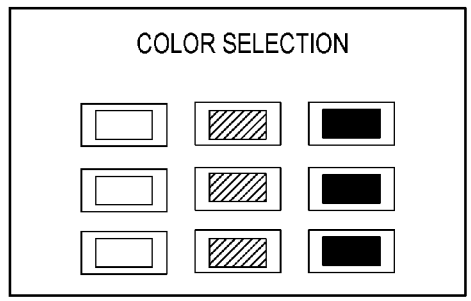

FIG. 2B shows a rendering tool selection GUI which is displayed when the user taps the rendering tool selection icon 201. When the user selects one of a pen 211, a crayon 212, a writing brush 213, a paint brush 214, and a spray 215, the user can render a line segment. Note that when the user selects an item for rendering a line segment in the rendering tool selection GUI, the user can make a corresponding setting by tapping the line type selection icon 202 or color selection icon 203 to transit to a GUI shown in FIG. 2C or 2D. The rendering tool selection GUI also includes an eraser 216 for removing a rendered object (a line segment, a graphic, or the like).

Figure 2E:
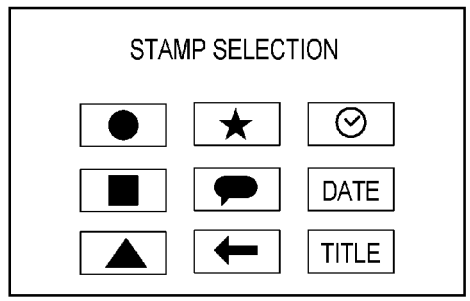
Figure 2F:
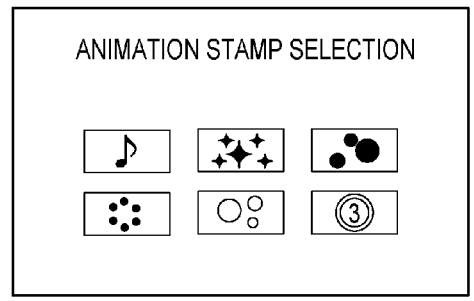

FIGS. 2E and 2F show selection GUIs to which the screen transits when the user taps the stamp selection icon 204 and the animation stamp selection icon 205, respectively. Unlike the above-described tools for rendering a line segment, a stamp or animation stamp enables to place a preset graphic or a character string graphic such as a capture time. The animation stamp indicates a stamp for rendering a graphic which changes over time.

As described above, when the user selects a rendering tool or stamp using a GUI, he/she can perform rendering on a captured image being live-view displayed. More specifically, by setting as a start position a pointing position at which a touchdown is detected, a line segment or graphic is rendered according to a locus (locus of a "move" operation) which is continuously input from the start position in one input operation, that is, from when the touchdown is detected until a touchup is detected.

(Rendering Control Processing)

Figure 3:
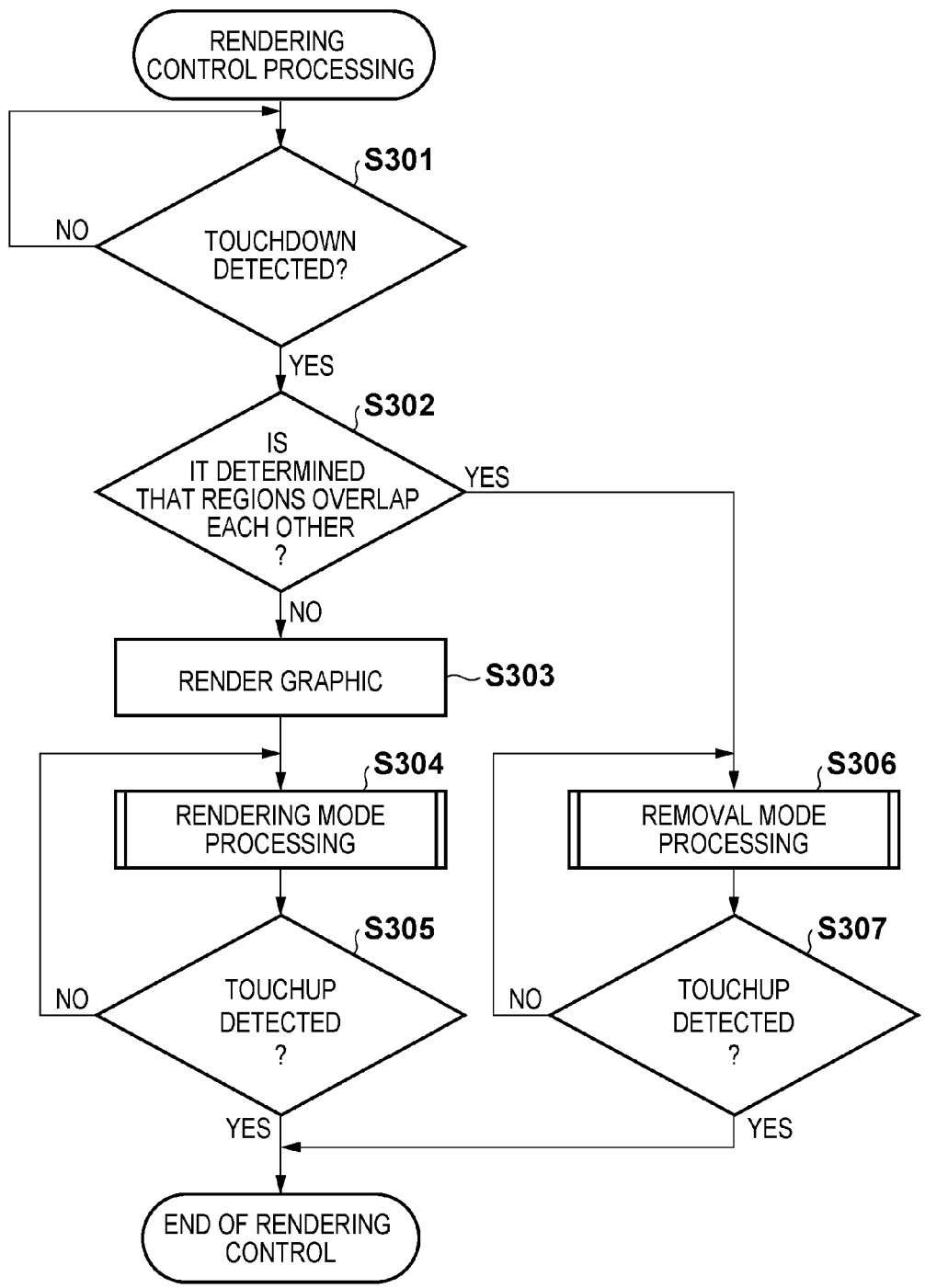
FIG. 3 is a flowchart illustrating rendering control processing according to the embodiment of the present invention.

Rendering control processing by the digital video camera 100 having the above-described configuration according to the embodiment will be described in detail with reference to a flowchart shown in FIG. 3. It is possible to implement processing corresponding to the flowchart when the system control unit 101 reads out a corresponding processing program stored in, for example, the non-volatile memory 114, expands the program on the system memory 113, and executes it. Assume that the rendering control processing starts when the user operates the mode selection SW of the operation input unit 115 to set to a special capture mode for capturing a moving image in which an object is placed within its frame.

In step S301, the system control unit 101 determines whether the user has performed, on the display unit 111, a touch input for rendering or removing an object. More specifically, the system control unit 101 determines whether selection of a rendering tool is complete and the operation input unit 115 has detected a "touchdown" operation at a position within an image live view display region. If a touch input has been performed, the system control unit 101 advances the process to step S302; otherwise, the system control unit 101 repeats the processing in step S301 until a touch input is performed. The rendering control processing will be explained below by assuming that an animation stamp has been selected as a rendering tool.

In step S302, the system control unit 101 determines whether there exists a graphic already rendered at a pointing start position where the "touchdown" operation has been detected in step S301. More specifically, the system control unit 101 determines whether a region (pointing region) whose center is at the pointing start position and which has a preset size for a graphic to be rendered overlaps a region (rendered region) preset for an already rendered graphic.

Figure 4B:
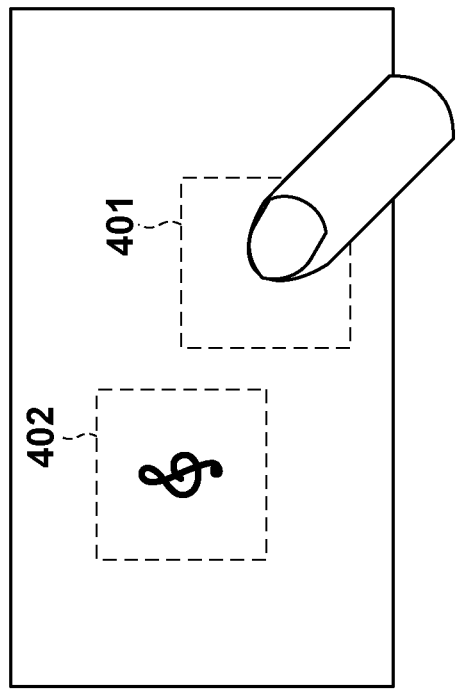
FIGS. 4A and 4B are views for explaining input start position overlapping determination according to the embodiment of the present invention.
Figure 4A:
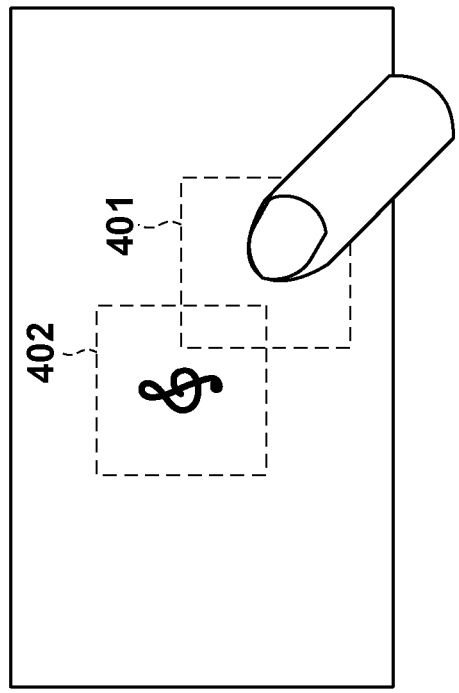

If the system control unit 101 determines that, as shown in FIG. 4A, a graphic has already been rendered in the image live view display region and a pointing region 401 and a rendered region 402 associated with the already rendered graphic do not overlap each other, the process advances to step S303. Alternatively, if the system control unit 101 determines that, as shown in FIG. 4B, the rendered region 402 and the pointing region 401 overlap each other, the process advances to step S306.

Figure 5:
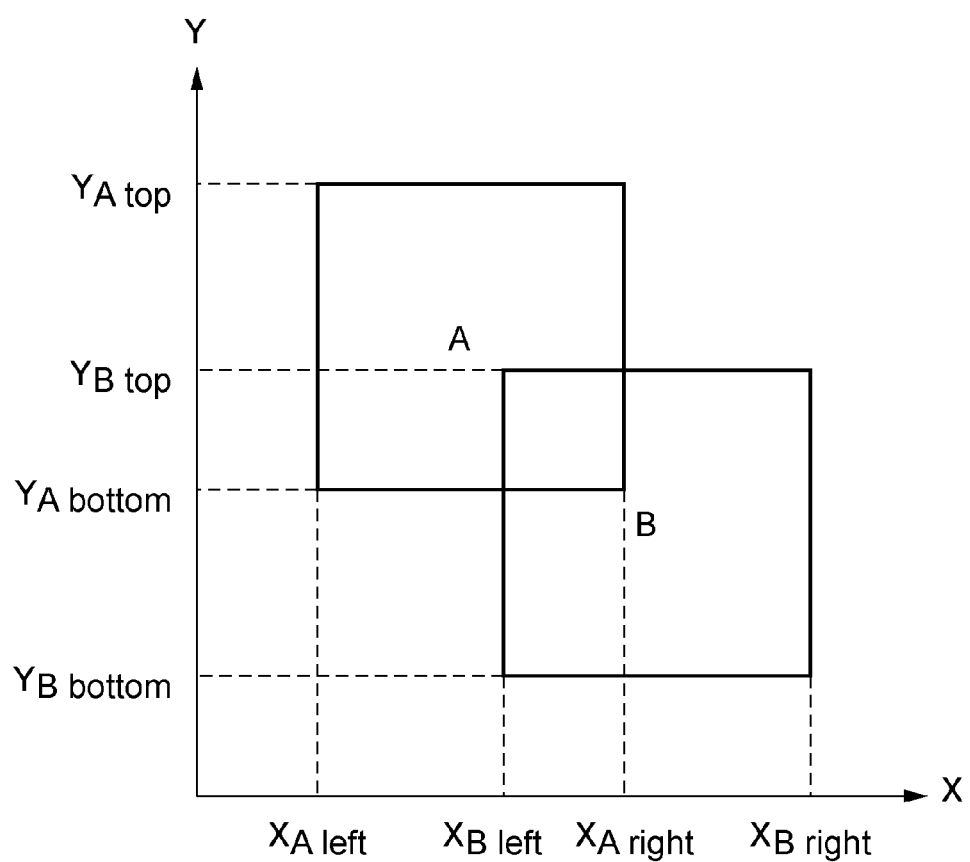
FIG. 5 is a view for explaining conditional expressions for overlapping determination according to the embodiment of the present invention.

If both the pointing region and the rendered region are rectangular, it is possible to use the coordinates of the diagonal points positioned at the upper left corner and lower right corner of each region to make the determination whether the regions overlap each other. If, for example, two regions A and B overlap each other as shown in FIG. 5, the following four conditional expressions simultaneously hold.

$$XAleft<XBright \quad (1)$$

$$XBleft<XAright \quad (2)$$

$$YBbottom<YAtop \quad (3)$$

$$YAbottom<YBtop \quad (4)$$

That is, if the four conditions hold, the system control unit 101 determines that the regions overlap each other. Assume, in this embodiment, that it is determined based on the above-described conditional expressions whether a rectangular region preset for each graphic rendered in the image live view display region overlaps a region whose center is a pointing start position and which has been preset for a graphic to be rendered. In this case, when a graphic is rendered, the system control unit 101 acquires information of a region preset for the graphic, and stores it in the system memory 113. The present invention, however, is not limited to this, and a rendered region and a pointing region need not be rectangular, and may have an arbitrary shape.

The region which has been preset for a graphic to be rendered and which is assigned as a pointing region need not be a region whose center is at a position where the "touchdown" operation is detected, and may be a region having, as a reference, the position where the "touchdown" operation is detected which is placed at the upper left coordinates of the region. Furthermore, the pointing region or rendered region may always have the same size, or may have a size set depending on the size of a graphic to be rendered such as the size of a transparent region of a graphic to be rendered or an already rendered graphic.

In step S303, the system control unit 101 determines that an operation input in the image live view display region is associated with rendering of a graphic, and renders a graphic selected in the animation stamp selection GUI at the position where the "touchdown" operation is detected. At this time, simultaneously with setting a new rendering timer in the system timer 112 and starting it, the system control unit 101 newly sets and starts a removal timer for counting a time until the rendered graphic is automatically removed, which has been preset for the rendered graphic. The system control unit 101 also stores, in the system memory 113, coordinate information of the rendered region set for the rendered graphic.

Assume that for each graphic rendered in the image live view display region, a time until the graphic is automatically removed has been preset in the digital video camera 100 of the embodiment. This is because a capture angle and the state of an object may change during capturing of a moving image, thereby eliminating the need for rendering a graphic. A time until a graphic is automatically removed may be a constant time or a different time for each type of stamp or each stamp size. In this embodiment, for descriptive convenience, assume that a constant value of 10 sec has been set as a time until a graphic is automatically removed.

After that, the system control unit 101 executes rendering mode processing in step S304. The rendering mode processing is repeatedly executed until the system control unit 101 determines in step S305 that a "touchup" operation has been detected.

(Rendering Mode Processing)

Figure 6A:
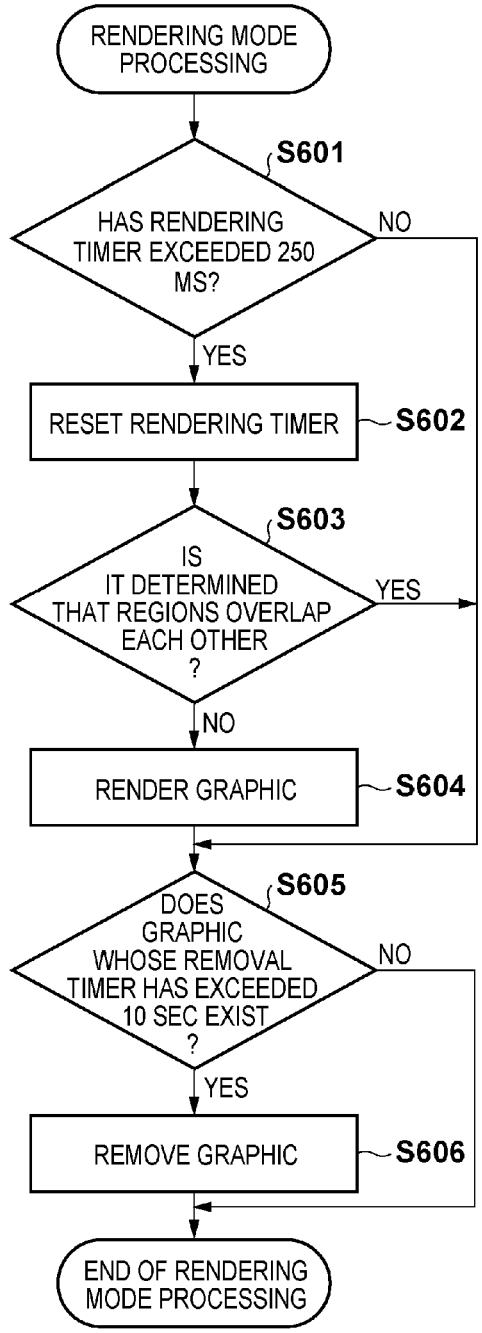
FIGS. 6A and 6B are flowcharts illustrating rendering mode processing and removal mode processing, respectively, according to the embodiment of the present invention.

The rendering mode processing of the embodiment which is executed when it is determined that an operation input in the image live view display region is associated with rendering of a graphic will be described with reference to a flowchart shown in FIG. 6A.

Figure 7A:
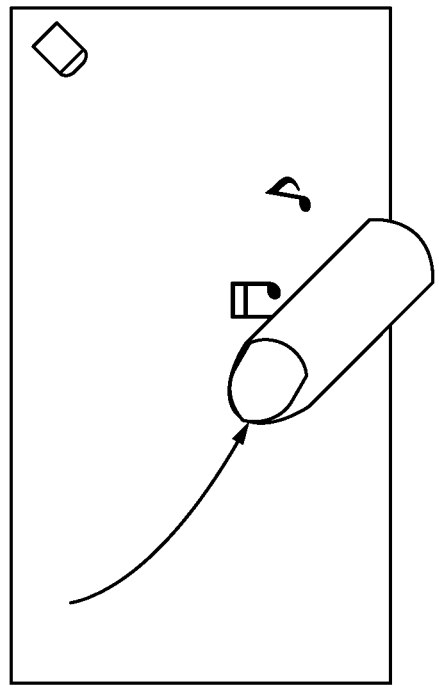
FIGS. 7A and 7B are views for explaining a rendering mode and a removal mode, respectively, according to the embodiment of the present invention.

In step S601, the system control unit 101 determines whether a rendering timer set in the system timer 112 has exceeded 250 ms. In this embodiment, when one input continues as shown in FIG. 7A, a graphic is rendered at a given interval (250 ms) according to the locus of a continuously input position. That is, the system control unit 101 determines in step S601 whether to render a next graphic. If the system control unit 101 determines that the rendering timer has exceeded 250 ms, the process advances to step S602; otherwise, the process advances to step S605.

In step S602, the system control unit 101 resets and restarts the count of the rendering timer set in the system memory 113.

In step S603, the system control unit 101 determines whether a pointing region whose center is at a position where an input is currently performed in the display unit 111 overlaps a rendered region associated with an already rendered graphic. If the system control unit 101 determines that the pointing region and the rendered region do not overlap each other, the process advances to step S604; otherwise, the process advances to step S605.

In this embodiment, if, as shown in FIG. 8C, a rendered region 812 and a pointing region 811 whose center is at a position where an input is performed do not overlap each other, the system control unit 101 determines that it is possible to render a new graphic. Alternatively, assume that the pointing region 811 and the rendered region 812 overlap each other, as shown in FIG. 8D. In this case, if the system control unit 101 renders a new graphic, the graphic overlaps the already rendered graphic. The system control unit 101, therefore, determines that no graphic is rendered.

In step S604, the system control unit 101 renders a graphic selected in the animation stamp selection GUI at the position where the input is performed, newly sets a removal timer for the graphic in the system timer 112, and starts it.

In step S605, the system control unit 101 determines whether there is a graphic, of already rendered graphics, whose removal timer set in the system timer 112 has exceeded 10 sec. If the system control unit 101 determines that there is a graphic to be automatically removed, the process advances to step S606 to stop rendering of the graphic and end the rendering mode processing; otherwise, the rendering mode processing ends.

With this operation, the rendering mode processing of the embodiment can place a new graphic in the image live view display region while controlling to render the new graphic so as not to overlap an already rendered graphic. That is, even in a "move" operation whose movement speed is low, it is possible to control to render a new graphic so as not to overlap an already rendered graphic without forcibly rendering a graphic at a given interval.

If it is determined in step S302 of the rendering control processing that the pointing region and the rendered region overlap each other, the system control unit 101 executes the following processing. That is, the system control unit 101 determines in step S306 that the operation input in the image live view display region is associated with removal of an already rendered graphic, and executes a removal mode processing. Note that the removal mode processing is repeatedly executed until the system control unit 101 determines that a "tap" operation has been detected in step S307.

(Removal Mode Processing)

Figure 6B:
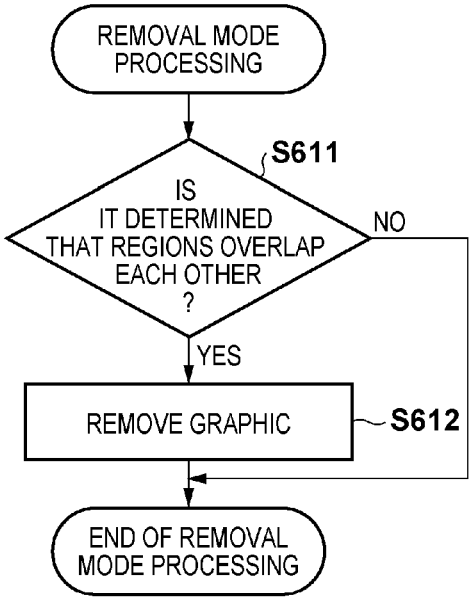

The removal mode processing of the embodiment which is executed when it is determined that an operation input in the image live view display region is associated with removal of an already rendered graphic will be described with reference to a flowchart shown in FIG. 6B.

In step S611, the system control unit 101 determines whether a pointing region whose center is at a position where an input is currently performed in the display unit 111 overlaps a rendered region associated with an already rendered graphic. If the system control unit 101 determines that the pointing region and the rendered region overlap each other, the process advances to step S612; otherwise, the removal mode processing ends.

Figure 7B:
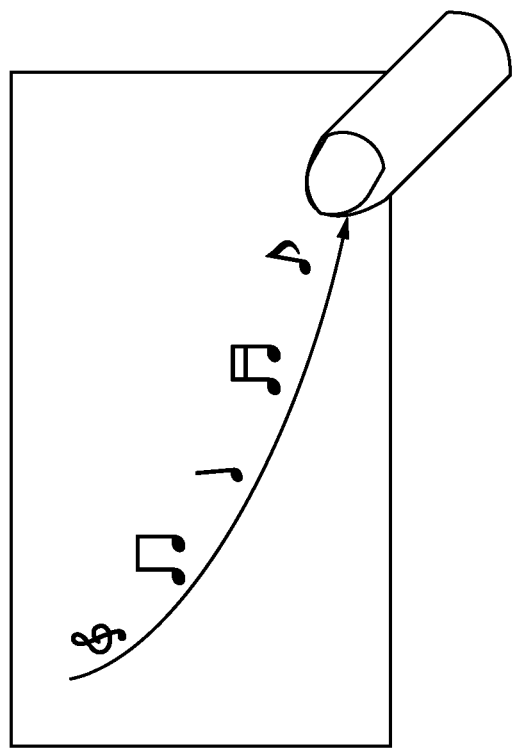

In step S612, the system control unit 101 removes a graphic associated with the rendered region which overlaps the pointing region, and ends the removal mode processing. That is, if already rendered graphics exist in the image live view display region as shown in FIG. 7A, the user can remove the graphics by performing a "move" operation shown in FIG. 7B for the graphics.

With this operation, the removal mode processing of the embodiment can omit a complicated operation for selecting a graphic removal tool when removing already rendered graphics. Unlike a tool for rendering a line segment, it is possible to reliably remove rendered graphics by performing a "move" operation once without repeatedly performing a "move" operation on already rendered graphics using the eraser tool for removing graphics.

In this embodiment, whether a rendered region and a pointing region upon detecting a touchdown overlap each other, and whether a rendered region and a pointing region whose center is at a position where an input is performed in a "move" operation overlap each other are determined. Overlapping determination for the two regions may not be limited to determination of whether the regions overlap each other.

For example, if both the pointing region and the rendered region are rectangular as shown in this embodiment, no graphic may be rendered near the vertices of the rectangular regions. Even if, therefore, one region overlaps the other region at its vertex, graphics may not overlap each other. In this case, the user may not be able to render a graphic at a desired position, or a removal mode may be unwantedly set. Therefore, in overlapping determination, it may be determined whether two regions overlap each other by a predetermined amount or more.

As described above, the display control apparatus of the embodiment can facilitate removing a graphic already rendered in an image. Alternatively, the apparatus can generate an image in which graphics have been rendered at desired positions while avoiding the graphics from overlapping. More specifically, when rendering a graphic according to the locus of a continuously input position, the display control apparatus determines whether a region which has been preset for a graphic to be rendered, and has the start position of a continuous input as a reference overlaps a region preset for an already rendered graphic by a predetermined amount or more. If the apparatus determines that the regions do not overlap each other by the predetermined amount or more, it renders a graphic according to the locus of the input position; otherwise, control is switched to remove already rendered graphics according to the locus of the input position. When rendering a graphic according to the locus of the position, it is determined whether a region which has been preset for the graphic to be rendered, and has the input position as a reference overlaps a region preset for an already rendered graphic by a predetermined amount or more. If it is determined that the regions overlap each other, the apparatus controls not to render the graphic.

With this operation, an operation of rendering a graphic or an operation of removing a graphic is automatically selected depending on a situation without performing a complicated operation. The user, therefore, can readily render and remove a graphic in a similar operation. Furthermore, since determination is made so that a graphic is rendered not to overlap an already rendered graphic, it is possible to generate an image which does not give the user the impression that it is hard to see.

(Modification)

In the rendering mode processing of the above-described embodiment, if it is determined that a pointing region whose center is at an input position does not overlap a rendered region associated with an already rendered graphic, no new graphic is rendered. In this case, for example, if a time for automatically removing a rendered graphic is set, the following situation may occur.

When, for example, a graphic rendering instruction is given across an already rendered graphic group 801 as shown in FIG. 8A, no new graphic is rendered on the graphic group 801. After that, if all the graphics of the graphic group 801 are automatically removed, the user may have the impression that the graphics rendered after the graphic group 801 are separated as shown in FIG. 8B although they have been continuously rendered.

To avoid such situation, if it is determined that a pointing region whose center is at an input position overlaps a rendered region associated with an already rendered graphic, the system control unit 101 need only perform the following processing. More specifically, the system control unit 101 need only specify a graphic associated with the rendered region which has been determined to overlap the pointing region, reset a removal timer for the graphic which has been set in the system timer 112, and restart counting.

With this operation, even if it is determined that an already rendered graphic overlaps a pointing region whose center is at an input position, it is possible to reset a time until the graphic is automatically removed. That is, even if there exists an already rendered graphic on the locus of the continuously input position when rendering a graphic according to the locus, it is possible to present the already rendered graphic as if it has been rendered according to the continuously input position.

In consideration of a change in capture angle or state of an object during capturing of a moving image, the user may desire to render a graphic according to the locus of a newly continuously input position. In this case, in the rendering mode processing, if there exists a graphic associated with a rendered region which has been determined to overlap a pointing region whose center is at an input position, the graphic may be removed, and a new graphic may be rendered at the input position.

In the above-described embodiment, a case in which an animation stamp is rendered as a graphic has been explained. When inputting a drawn line segment like a pen tool, separation of the drawn line may be undesired like a handwritten character. Assume that an input operation is performed to render a line segment. In this case, even if there exists an already rendered graphic or line segment, control may be performed to forcibly render a line segment at an input position.

Although the digital video camera 100 having a touch panel has been explained in this embodiment, the present invention is not limited to this, and is applicable to another device which has a UI for instructing an input of a position on a screen and can perform graphic rendering according to the input. That is, the present invention is not limited to a touch input performed on a touch panel, and is applicable to any device which can perform rendering by the user operation of a pointing device for performing a position input on a display screen. For example, it is readily understood that when a PC is used as a display control apparatus, an operation performed on the above-described touch panel may be associated with an operation performed using a mouse. In this case, the operation performed using the mouse need only be associated with that performed on the touch panel as follows:

pressing the left button of the mouse: a "touchdown" in a touch operation;

a state in which the left button of the mouse is pressed: a "touchon" in a touch operation;

an operation of releasing the left button of the mouse after pressing the left button: a "touchup" in a touch operation;

a state in which the left button of the mouse is not pressed: a "touchoff" in a touch operation; and a drag operation of the mouse (an operation of moving the mouse while pressing the left button): a "move" in a touch operation.

One hardware component may control the system control unit 101 or a plurality of hardware components may share the processing, thereby controlling the apparatus as a whole.

The present invention has been described in detail based on the preferred embodiment. The present invention, however, is not limited to the specific embodiment, and includes various modes within the spirit and scope of the present invention. The above-described embodiments are merely examples, and can be combined as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283733, filed Dec. 20, 2010, which is hereby incorporated by reference herein in its entirety.

What is claimed is:

1. A display control apparatus comprising:
a position input unit configured to input a position on a screen of a display device;
a rendering unit configured to render a graphic according to a locus of the input position input by said position input unit;
a determination unit configured to determine whether a predetermined region having, as a reference, a start position of one input performed by said position input unit overlaps a region preset for the graphic already rendered by said rendering unit by not less than a predetermined amount; and
a control unit configured to control, when said determination unit determines that the predetermined region having the start position as a reference does not overlap the preset region by not less than the predetermined amount, to cause said rendering unit to render a graphic according to the locus of the input position from the start position of the one input, and to control, when said determination unit determines that the predetermined region having the start position as a reference overlaps the preset region by not less than the predetermined amount, to remove the graphic already rendered by said rendering unit according to the locus of the input position from the start position of the one input.

2. The apparatus according to claim 1, wherein
said determination unit further determines, while one input performed by said position input unit continues, whether a predetermined region having, as a reference, a position where the input is performed overlaps the region preset for the graphic already rendered by said rendering unit by not less than a predetermined amount,
wherein when said determination unit determines that the predetermined region having the start position as a reference does not overlap the preset region by not less than the predetermined amount and said determination unit determines that the predetermined region having, as a reference, the position where the input is performed overlaps the preset region by not less than the predetermined amount, said control unit controls not to cause said rendering unit to render the graphic at the position where the input is performed.

3. The apparatus according to claim 2, further comprising:
a setting unit configured to set, when said rendering unit renders a graphic, a time until the rendered graphic is automatically removed,
wherein when said determination unit determines that the predetermined region having, as a reference, the position where the input is performed does not overlap the region preset for the graphic already rendered by said rendering unit by not less than the predetermined amount, said control unit controls to reset the time until the already rendered graphic is automatically removed, which has been set for the already rendered graphic by said setting unit.

4. The apparatus according to claim 3, wherein the time until the rendered graphic is automatically removed, which is set by said setting unit, is a time preset for each type of graphic to be rendered.

5. The apparatus according to claim 2, wherein when one input performed by said position input unit is an input for rendering a line segment, determination by said determination unit is not made.

6. The apparatus according to claim 1, wherein
said determination unit determines, while one input performed by said position input unit continues, whether a predetermined region having, as a reference, a position where the input is performed overlaps the region preset for the graphic already rendered by said rendering unit by not less than a predetermined amount,
wherein when said determination unit determines that the predetermined region having the start position as a reference does not overlap the preset region by not less than the predetermined amount and said-determination unit determines that the predetermined region having, as a reference, the position where the input is performed overlaps the preset region by not less than the predetermined amount, said control unit controls to remove the already rendered graphic at the position where the input is performed, and to cause said rendering unit to render a graphic depending on the position where the input is performed.

7. The apparatus according to claim 1, further comprising:
an image capturing unit configured to capture an object; and
a storage unit configured to record a moving image captured by said image capturing unit,
wherein when said rendering unit has rendered a graphic on an image captured by said image capturing unit, said storage unit records the moving image together with the graphic.

8. The apparatus according to claim 1, wherein
said position input unit inputs a position on the screen by detecting an input on a touch panel arranged on the display device, and
the one input is an input from when a finger touches the touch panel until the finger gets off the touch panel.

9. A non-transitory computer-readable storage medium storing a program that when executed by a computer causes the computer to function as the display control apparatus according to claim 1.

10. A display control apparatus comprising:
a position input unit configured to input a position on a screen of a display device;
a rendering unit configured to render a graphic according to a locus of the input position input by said position input unit;
a determination unit configured to determine, while one input performed by said position input unit continues, whether a predetermined region having, as a reference, a position where the input is performed overlaps a region preset for the graphic already rendered by said rendering unit by not less than a predetermined amount; and
a control unit configured to control, when said determination unit determines that the predetermined region having, as a reference, the position where the input is performed overlaps the preset region by not less than the predetermined amount, not to cause said rendering unit to render a graphic.

11. A display control apparatus comprising:
a position input unit configured to input a position on a screen of a display device;
a rendering unit configured to render a graphic according to a locus of the input position input by said position input unit;
a determination unit configured to determine, while one input performed by said position input unit continues, whether a predetermined region having, as a reference, a position where the input is performed overlaps a region preset for the graphic already rendered by said rendering unit by not less than a predetermined amount; and
a control unit configured to control, when said determination unit determines that the predetermined region having, as a reference, the position where the input is performed overlaps the preset region by not less than the predetermined amount, to remove the already rendered graphic and to cause said rendering unit to render, while the one input performed by said position input unit continues, a graphic depending on the position where the input is performed.

12. A display control apparatus comprising:
a position input unit configured to input a position on a screen of a display device;
a rendering unit configured to render a graphic according to a locus of the input position input by said position input unit;
a determination unit configured to determine whether a predetermined region having, as a reference, a start position of one input performed by said position input unit overlaps a region preset for the graphic already rendered by said rendering unit; and
a control unit configured to control, when said determination unit determines that the predetermined region having the start position as a reference does not overlap the preset region, to cause said rendering unit to render a graphic according to the locus of the input position from the start position of the one input, and to control, when said determination unit determines that the predetermined region having the start position as a reference overlaps the preset region, to remove the graphic already rendered by said rendering unit according to the locus of the input position from the start position of the one input.

13. A display control apparatus comprising:
a position input unit configured to input a position on a screen of a display device;
a rendering unit configured to render a graphic according to a locus of the input position input by said position input unit;
a determination unit configured to determine, while one input performed by said position input unit continues, whether a predetermined region having, as a reference, a position where the input is performed overlaps a region preset for the graphic already rendered by said rendering unit; and
a control unit configured to control, when said determination unit determines that the predetermined region having, as a reference, the position where the input is performed overlaps the preset region, not to cause said rendering unit to render a graphic while one input performed by said position input unit continues.

14. A control method for a display control apparatus, comprising:
a position input step of inputting a position on a screen of a display device;
a rendering step of rendering a graphic according to a locus of the input position input in the position input step;
a determination step of determining whether a predetermined region having, as a reference, a start position of one input performed in the position input step overlaps a region preset for the graphic already rendered in the rendering step by not less than a predetermined amount; and
a control step of controlling, when it is determined in the determination step that the predetermined region having the start position as a reference does not overlap the preset region by not less than the predetermined amount, to render a graphic in the rendering step according to the locus of the input position from the start position of the one input, and controlling, when it is determined in the determination step that the predetermined region having the start position as a reference overlaps the preset region by not less than the predetermined amount, to remove the graphic already rendered in the rendering step according to the locus of the input position from the start position of the one input.

15. A control method for a display control apparatus, comprising:
a position input step of inputting a position on a screen of a display device;
a rendering step of rendering a graphic according to a locus of the input position input in the position input step;
a determination step of determining, while one input performed in the position input step continues, whether a predetermined region having, as a reference, a position where the input is performed overlaps a region preset for the graphic already rendered in the rendering step by not less than a predetermined amount; and a control step of controlling, when it is determined in the determination step that the predetermined region having, as a reference, the position where the input is performed overlaps the preset region by not less than the predetermined amount, not to render a graphic in the rendering step.

16. A control method for a display control apparatus, comprising:
   a position input step of inputting a position on a screen of a display device;
   a rendering step of rendering a graphic according to a locus of the input position input in the position input step;
   a determination step of determining, while one input performed in the position input step continues, whether a predetermined region having, as a reference, a position where the input is performed overlaps a region preset for the graphic already rendered in the rendering step by not less than a predetermined amount; and
   a control step of controlling, when it is determined in the determination step that the predetermined region having, as a reference, the position where the input is performed overlaps the preset region by not less than the predetermined amount, to remove the already rendered graphic and to render, while the one input performed by said position input step continues, a graphic in the rendering step depending on the position where the input is performed.

17. A control method for a display control apparatus, comprising:
   a position input step of inputting a position on a screen of a display device;
   a rendering step of rendering a graphic according to a locus of the input position input in the position input step;
   a determination step of determining whether a predetermined region having, as a reference, a start position of one input performed in the position input step overlaps a region preset for the graphic already rendered in the rendering step; and
   a control step of controlling, when it is determined in the determination step that the predetermined region having the start position as a reference does not overlap the preset region, to render a graphic in the rendering step according to the locus of the input position from the start position of the one input, and to control, when it is determined in the determination step that the predetermined region having the start position as a reference overlaps the preset region, to remove the graphic already rendered in the rendering step according to the locus of the input position from the start position of the one input.

18. A control method for a display control apparatus, comprising:
   a position input step of inputting a position on a screen of a display device;
   a rendering step of rendering a graphic according to a locus of the input position input in the position input step;
   a determination step of determining, while one input performed in the position input step continues, whether a predetermined region having, as a reference, a position where the input is performed overlaps a region preset for the graphic already rendered in the rendering step; and
   a control step of controlling, when it is determined in the determination step that the predetermined region having, as a reference, the position where the input is performed overlaps the preset region, not to render a graphic in the rendering step.

19. A display control apparatus comprising:
   a position input unit configured to input a position on a screen of a display device;
   a rendering unit configured to render a graphic according to a locus of the input position input by said position input unit;
   a determination unit configured to determine whether a first region corresponding to a start position of one continuous input performed by said position input unit overlaps a second region corresponding to the graphic already rendered by said rendering unit by not less than a predetermined amount; and
   a control unit configured to control, in a case where said determination unit determines that the first region corresponding to the start position does not overlap the second region by not less than the predetermined amount, to cause said rendering unit to render a graphic according to the locus of the input position from the start position of the one continuous input, and to control, in a case where said determination unit determines that the first region corresponding to the start position overlaps the second region by not less than the predetermined amount, to remove the graphic already rendered by said rendering unit in accordance with the locus of the input position from the start position of the one continuous input.

20. The apparatus according to claim 19, wherein
   said determination unit further determines, while one input performed by said position input unit continues, whether a third region corresponding to a position where the input is performed overlaps the second region corresponding to the graphic already rendered by said rendering unit by not less than a predetermined amount,
   wherein in a case where said determination unit determines that the first region corresponding to the start position does not overlap the second region by not less than the predetermined amount and said determination unit determines that the third region corresponding to the position where the input is performed overlaps the second region by not less than the predetermined amount, said control unit controls not to cause said rendering unit to render the graphic at the position where the input is performed.

21. The apparatus according to claim 20, further comprising:
   a setting unit configured to set, when said rendering unit renders a graphic, a time until the rendered graphic is automatically removed,
   wherein when said determination unit determines that the third region corresponding to the position where the input is performed does not overlap the second region corresponding to the graphic already rendered by said rendering unit by not less than the predetermined amount, said control unit controls to reset the time until the already rendered graphic is automatically removed, which has been set for the already rendered graphic by said setting unit.

22. The apparatus according to claim 20, wherein when one continuous input performed by said position input unit is an input for rendering a line segment, determination by said determination unit is not made.

23. The apparatus according to claim 19, wherein
   said determination unit determines, while one continuous input performed by said position input unit continues, whether a third region corresponding to a position where the input is performed overlaps the second region corresponding to the graphic already rendered by said rendering unit by not less than a predetermined amount, wherein in a case where said determination unit determines that the first region corresponding to the start position does not overlap the second region by not less than the predetermined amount and said determination unit determines that the third region corresponding to the position where the input is performed overlaps the second region by not less than the predetermined amount, said control unit controls to remove the already rendered graphic at the position where the input is performed, and to cause said rendering unit to render a graphic depending on the position where the input is performed.

24. The apparatus according to claim 19, further comprising:

an image capturing unit configured to capture an object; and a storage unit configured to record a moving image captured by said image capturing unit, wherein when said rendering unit has rendered a graphic on an image captured by said image capturing unit, said storage unit records the moving image together with the graphic.

25. The apparatus according to claim 19, wherein said position input unit inputs a position on the screen by detecting an input on a touch panel arranged on the display device, and the one continuous input is an input from when a finger touches the touch panel until the finger gets off the touch panel.

26. The apparatus according to claim 19, wherein the graphic is stamp image that have predetermined rendering area.

27. A non-transitory computer-readable storage medium storing a program that when executed by a computer causes the computer to function as the display control apparatus according to claim 19.

28. A display control apparatus comprising:

a position input unit configured to input a position on a screen of a display device;

a rendering unit configured to render a graphic according to a locus of the input position input by said position input unit;

a determination unit configured to determine, while one continuous input performed by said position input unit continues, whether a first region corresponding to a position where the input is performed overlaps a second region corresponding to the graphic already rendered by said rendering unit by not less than a predetermined amount; and a control unit configured to control, when said determination unit determines that the first region corresponding to the position where the input is performed overlaps the second region by not less than the predetermined amount, not to cause said rendering unit to render a graphic.

29. A non-transitory computer-readable storage medium storing a program that when executed by a computer causes the computer to function as the display control apparatus according to claim 28.

30. A control method for a display control apparatus, comprising:

a position input step of inputting a position on a screen of a display device;

a rendering step of rendering a graphic according to a locus of the input position input in the position input step;

a determination step of determining whether a first region corresponding to a start position of one continuous input performed in the position input step overlaps a second region corresponding to the graphic already rendered in the rendering step by not less than a predetermined amount; and a control step of controlling, in a case where it is determined in the determination step that the first region corresponding to the start position does not overlap the second region by not less than the predetermined amount, to render a graphic in the rendering step according to the locus of the input position from the start position of the one continuous input, and controlling, in a case where it is determined in the determination step that the first region corresponding to the start position overlaps the second region by not less than the predetermined amount, to remove the graphic already rendered in the rendering step in accordance with the locus of the input position from the start position of the one continuous input.

31. A control method for a display control apparatus, comprising:

a position input step of inputting a position on a screen of a display device;

a rendering step of rendering a graphic according to a locus of the input position input in the position input step;

a determination step of determining, while one continuous input performed in the position input step continues, whether a first region corresponding to a position where the input is performed overlaps a second region corresponding to the graphic already rendered in the rendering step by not less than a predetermined amount; and a control step of controlling, in a case where it is determined in the determination step that the first region corresponding to the position where the input is performed overlaps the second region by not less than the predetermined amount, not to render a graphic in the rendering step.

* * * * *